Patented Oct. 13, 1925.

1,557,521

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

CYCLOHEXANOL-ALDEHYDE RESIN AND PROCESS OF MAKING THE SAME.

No Drawing. Application filed March 30, 1923. Serial No. 628,748.

*To all whom it may concern:*

Be it known that I, CARLETON ELLIS, a citizen of the United States, and a resident of Montclair, in the county of Essex and State of New Jersey, have invented certain new and useful Improvements in Cyclohexanol-Aldehyde Resins and Processes of Making the Same, of which the following is a specification.

This invention relates to a resin or resinous composition derived from cyclic aliphatic alcohols, such for example as cyclohexanol and relates particularly to resins obtained from such cyclic bodies by reaction thereon with an aldehyde such as formaldehyde.

To illustrate the invention 10 parts (by weight) of cyclohexanol, 3 parts of paraform and 5 parts of aqueous caustic potash solution, 50 per cent strength, were mixed. On heating a violent reaction took place and the mixture became colored dark brown. This reaction mixture was heated for 3 hours under a reflux condenser. A resinous mass was obtained which was purified by dissolving in benzol, separating from any material insoluble in benzol and evaporating the solution to dryness. A dark brown clear transparent, fusible resin was obtained. This possesses the property of becoming infusible when heated for a time on an ordinary laboratory hot plate. Besides being readily soluble in benzol the fusible resin is also soluble in a mixture of benzol and alcohol. When hexamethylenetetramine is admixed with the resin and the mixture is heated an infusible product is readily obtained.

The cyclohexanol or other raw material employed (e. g. tetra, penta, hepta,) which is appropriate for the purpose of yielding resinous substances may likewise be reacted upon by aqueous formaldehyde in the presence of a strong concentration of caustic potash or caustic soda. Other polymers of formaldehyde and acetaldehyde, e. g. paraldehyde and higher aldehydes capable of reacting with the cyclic alcohol to produce resins of appropriate quality likewise may be employed. Other alkaline condensing agents also may be used and the condensation may take place in the presence or absence of solvents or diluents and under atmospheric pressure or under pressures above or below atmospheric.

The resin may be incorporated with suitable fillers such as are commonly employed in the plastic arts, e. g. asbestos or wood flour, and the mixture may be molded into shape either hot or cold. If molded in the cold the shaped article may be carefully baked at a gradually increasing temperature after removal from the mold so as to bring about hardening. The composition when molded in a hot press need not be further heated after removal from the mold unless special hardening effects are desired. The addition of 5 or 10 per cent of hexamethylenetetramine to the cyclohexanol resin molding composition is advantageous in accelerating any reaction which may take place in the mold during hot pressing. In some cases also the hexamethylenetetramine compound apparently serves as a hardening agent of considerable efficiency.

When a large proportion of strongly alkaline catalyst is employed in preparing the resin the catalyst should be largely or entirely removed or neutralized in case the resin is to be used for making a molding composition. Small amounts of alkaline catalysts are not objectionable in many molding compositions and even are desirable in some cases to accelerate setting or hardening when hot pressing or baking. Acid catalysts generally speaking are undesirable in finished molding compositions.

What I claim is:—

1. A resinous composition prepared from cyclohexanol and formaldehyde.

2. A resinous substance prepared from cyclohexanol and an aldehyde in the presence of a catalyst.

3. The process of making a resin which comprises heating cyclohexanol and an aldehyde in the presence of caustic alkali.

4. The process of making a resin which comprises heating cyclohexanol and formaldehyde in the presence of a caustic alkali.

5. A product containing resinous substance comprising a cyclohexanol-formaldehyde resin, in an insoluble and infusible condition.

CARLETON ELLIS.